(12) United States Patent
Kunert

(10) Patent No.: US 12,097,921 B2
(45) Date of Patent: Sep. 24, 2024

(54) HOLDING DEVICE FOR RELEASABLY HOLDING AN ENERGY STORE ON A FRAME UNIT, AND BICYCLE FRAME

(71) Applicant: Robert Bosch GmbH, Stuttgart (DE)

(72) Inventor: Peter Kunert, Lichtenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 312 days.

(21) Appl. No.: 17/632,153

(22) PCT Filed: Sep. 2, 2020

(86) PCT No.: PCT/EP2020/074414
§ 371 (c)(1),
(2) Date: Feb. 1, 2022

(87) PCT Pub. No.: WO2021/043794
PCT Pub. Date: Mar. 11, 2021

(65) Prior Publication Data
US 2022/0266938 A1    Aug. 25, 2022

(30) Foreign Application Priority Data
Sep. 4, 2019    (DE) .............. 10 2019 213 426.2

(51) Int. Cl.
*B62M 6/90*    (2010.01)
*B62J 43/13*    (2020.01)
*B62J 43/28*    (2020.01)

(52) U.S. Cl.
CPC .............. *B62J 43/13* (2020.02); *B62J 43/28* (2020.02); *B62M 6/90* (2013.01)

(58) Field of Classification Search
CPC .................................. B62M 6/80; B62M 6/90
See application file for complete search history.

(56) References Cited

U.S. PATENT DOCUMENTS 6,423,443 B1    7/2002  Tsuboi et al.
7,267,352 B2 *  9/2007  Ishikawa ................. B62M 6/90
                                                                429/96

(Continued)

FOREIGN PATENT DOCUMENTS

CN    202703827 U    1/2013
CN    106347560 A    1/2017

(Continued)

OTHER PUBLICATIONS

International Search Report for PCT/EP2020/074414, Issued Nov. 10, 2020.

*Primary Examiner* — Erez Gurari
(74) *Attorney, Agent, or Firm* — NORTON ROSE FULBRIGHT US LLP; Gerard A. Messina

(57) ABSTRACT

A holding device for releasably holding an energy store at a frame unit, in particular, at a bicycle frame. The holding device includes at least one carrier unit and a stop unit connected to a carrier element of the carrier unit. The holding device includes a tensioning unit, which is provided to fix the energy store at the carrier unit in a tensioned operating state and to clamp the energy store between the tensioning unit and the stop unit in an operating position in such a way that the tensioning unit in the tensioned operating state exerts a pressure force on the energy store, which acts in the direction of the stop unit, in particular, parallel to a longitudinal direction of the carrier element.

14 Claims, 8 Drawing Sheets

(56) References Cited

U.S. PATENT DOCUMENTS

| | | | |
|---|---|---|---|
| 8,727,367 B2* | 5/2014 | Talavasek | B62K 19/06 |
| | | | 280/281.1 |
| 8,881,857 B2* | 11/2014 | Binggeli | B62M 6/90 |
| | | | 180/68.5 |
| 9,302,735 B2* | 4/2016 | Tagaya | B62M 6/90 |
| 9,488,366 B2* | 11/2016 | Yano | F21V 33/0052 |
| 10,183,591 B2* | 1/2019 | Shieh | B62K 19/40 |
| 10,868,288 B2* | 12/2020 | Nishihara | B62M 6/90 |
| 10,875,594 B2* | 12/2020 | Zhou | B62M 6/45 |
| 10,906,609 B2* | 2/2021 | Talavasek | B62M 6/50 |
| 10,906,610 B2* | 2/2021 | Talavasek | B62J 43/13 |
| 10,994,620 B2* | 5/2021 | Shieh | B62K 25/286 |
| 11,124,259 B2* | 9/2021 | Talavasek | B62J 43/13 |
| 11,211,663 B2* | 12/2021 | Yoneda | B62K 19/30 |
| 11,279,440 B2* | 3/2022 | Bock | B62M 6/90 |
| 11,345,437 B2* | 5/2022 | Talavasek | B62J 43/28 |
| 11,565,769 B2* | 1/2023 | Lechevallier | B62H 5/001 |
| 11,572,132 B2* | 2/2023 | den Hertog | H01M 50/20 |
| 11,581,606 B2* | 2/2023 | Bosscher | B62M 6/90 |
| 11,621,454 B2* | 4/2023 | Liu | B62J 43/13 |
| | | | 429/163 |
| 2010/0177507 A1 | 7/2010 | West et al. | |
| 2010/0237585 A1 | 9/2010 | Binggeli et al. | |
| 2013/0241170 A1 | 9/2013 | Talavasek et al. | |
| 2013/0241174 A1* | 9/2013 | Meyer | B62K 25/30 |
| | | | 280/281.1 |
| 2015/0114734 A1 | 4/2015 | Ogawa | |
| 2015/0158551 A1* | 6/2015 | Ogawa | B62M 6/65 |
| | | | 180/207.3 |
| 2020/0247502 A1* | 8/2020 | Mitsuyasu | H01M 50/202 |
| 2022/0048586 A1* | 2/2022 | Trif | B62J 6/16 |
| 2022/0106013 A1* | 4/2022 | Thoma | B62J 43/13 |
| 2022/0289336 A1* | 9/2022 | Philipzik | B62J 43/13 |
| 2023/0062620 A1* | 3/2023 | Matsuzaki | B62M 6/90 |

FOREIGN PATENT DOCUMENTS

| | | |
|---|---|---|
| CN | 107565070 A | 1/2018 |
| DE | 102010032801 A1 | 2/2012 |
| DE | 202013008187 U1 | 12/2014 |
| DE | 102016001325 A1 | 9/2016 |
| DE | 202016104142 U1 | 9/2016 |
| DE | 102016124710 A1 | 6/2017 |
| DE | 102016213903 B3 | 1/2018 |
| DE | 102018117819 A1 | 1/2019 |
| DE | 102019104238 A1 | 8/2019 |
| DE | 102019104919 A1 | 9/2019 |
| DE | 102019204013 A1 | 10/2019 |
| DE | 102019207122 A1 | 11/2019 |
| EP | 2230164 A1 | 9/2010 |
| JP | 2002193165 A | 7/2002 |

* cited by examiner

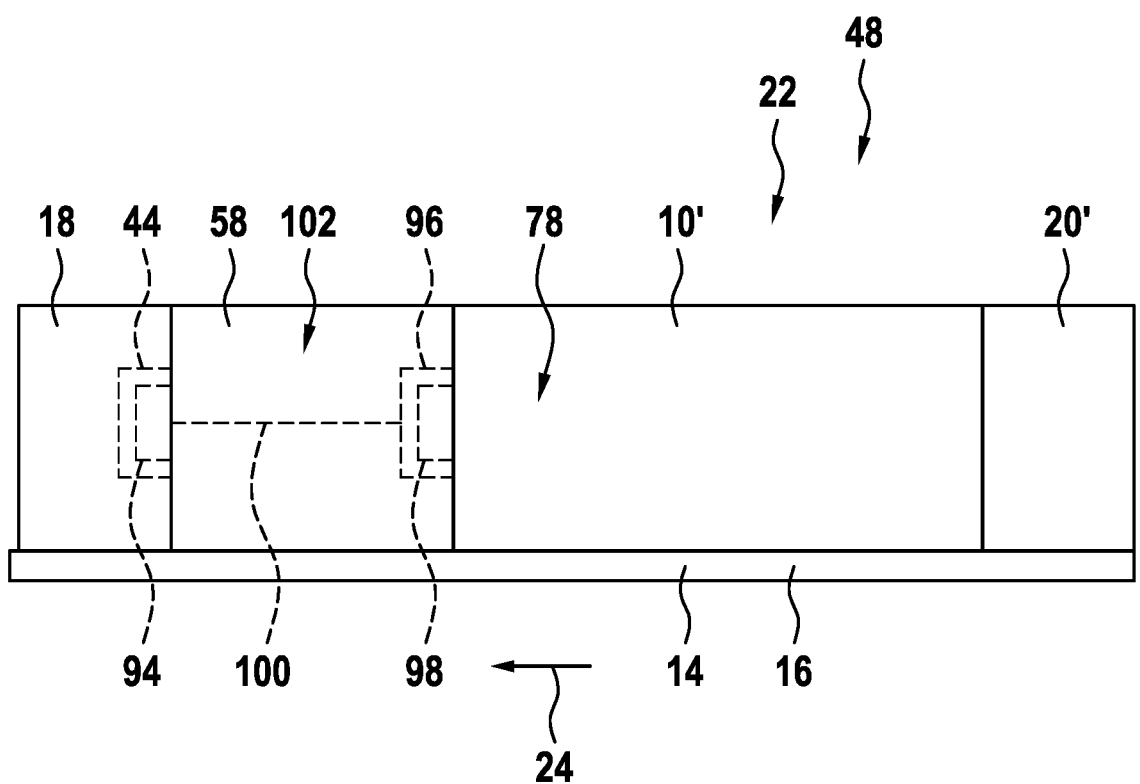

HOLDING DEVICE FOR RELEASABLY HOLDING AN ENERGY STORE ON A FRAME UNIT, AND BICYCLE FRAME

BACKGROUND INFORMATION

German Patent Application No. DE 10 2016 213 903 B3 describes a holding device for releasably holding an energy store on a frame unit, in particular, on a bicycle frame, including at least one carrier unit and including one stop unit connected to a carrier element of the carrier unit.

SUMMARY

The present invention is directed to a holding device for releasably holding an energy store on a frame unit, in particular, on a bicycle frame, including at least one carrier unit and including a stop unit connected to a carrier element of the carrier unit.

In accordance with an example embodiment of the present invention, it is provided that the holding device includes a tensioning unit, which is provided to fix the energy store on the carrier unit in a tensioned operating state and to mount, in particular, to clamp and/or to latch the energy store in place between the tensioning unit and the stop unit in an operating position in such a way that the tensioning unit in the tensioned operating state exerts a pressure force on the energy store, which acts in the direction of the stop unit, in particular, in parallel to a longitudinal direction of the carrier element. The design of the holding device according to the present invention may advantageously enable a simple and/or secure mounting, dismounting and/or holding of an energy store, in particular, in and/or at a bicycle. A slipping or a loosening of the energy store even in the case of strong vibrations may be advantageously prevented as a result of the tensioning force. A simultaneous fixing of the energy store in a longitudinal direction of the energy store and in a transverse direction perpendicular to the longitudinal direction, in particular, radial direction, may be advantageously achieved. High user-friendliness may be advantageously achieved.

In accordance with an example embodiment of the present invention, the holding device is preferably designed as a bicycle energy store holding device. The holding device is designed, in particular, to enable an at least temporary positioning of an energy store in and/or at a bicycle. The energy store is, in particular, easily mountable in or removable from the holding device, preferably without tools. The holding device is intended, in particular, to be fixed at a bicycle frame, preferably in a bicycle frame, for example, in an upper tube, in a saddle tube, in a control tube or preferably in a lower tube of the bicycle frame. For fixing in or at a bicycle frame, the holding device includes, in particular, fastening elements, for example, screw elements, plug elements or detent elements. Alternatively or in addition, it is possible that the holding device, preferably the carrier unit and/or the carrier element, is/are designed at least partially as one piece with the bicycle frame or at least a part of the holding device, preferably of the carrier unit and/or of the carrier element, is/are connected, for example, welded or bonded, as once piece to the bicycle frame. "As one piece" is understood to mean, in particular, integrally joined such as, for example, by a welding process and/or gluing process, etc., and particularly advantageously molded, as produced by a cast and/or as produced in a single or multicomponent injection molding method. One piece is advantageously understood to also mean integrally. "Integrally" is understood, in particular, to mean formed in one piece. This one piece is preferably produced from one single blank, from a compound and/or a cast, particularly preferably in an injection molding method, in particular, in a single component and/or multicomponent injection molding method.

An "energy store" is understood to mean, in particular, a component, which is able to accumulate, store and release energy, in particular, chemical and/or preferably electrical energy. The energy store may, in particular, be designed as a gas tank and/or fluid tank, preferably however, the energy store is designed as a battery store, in particular, as an accumulator, preferably as a bicycle accumulator. The energy store is provided, in particular, to provide energy for a drive unit of a bicycle, for example, an auxiliary motor of an E-bike or of a Pedelec. The carrier unit is used, in particular, to stabilize the holding device. Preferably, at least the carrier element of the carrier unit forms a guide rail, which is provided, in particular, to guide the energy store during a mounting, in particular, during an insertion, and/or during a dismounting, in particular, during a removal and, in the process, to define, in particular, a movement axis. The guide rail may, in particular, be provided to at least define an orientation of the energy store during an insertion of the energy store into the holding device. This may advantageously prevent an incorrect mounting of and/or damage to the energy store and/or to the holding device. It is possible that the energy store and the guide rail have a fit to one another functioning according to the Poka Yoke principle. The carrier unit may, in particular, be formed from one or from multiple carrier elements. The carrier element is designed, in particular, as a bent sheet metal part, in particular, from an aluminum sheet or from a steel sheet. Alternatively, the carrier element may also be formed from a plastic or from a special material such as, for example, carbon. The carrier element is, in particular, integrally formed. The carrier element and/or the energy store include(s) at least one slide element. This may advantageously prevent the energy store and/or the carrier element from being damaged or scratched. The stop element is connected to the carrier unit, in particular, to the carrier element of the carrier unit, in particular, in a force-fitting, form-fit and/or integral manner. The stop unit, in particular, limits a movement of the energy store relative to the carrier unit at least in a mounting direction or insertion direction of the energy store.

The "tensioned operating state" is understood to mean, in particular, a state of the holding device, in which the tensioning unit is tensioned, in which the energy store is fixed in the holding device and/or in which the energy store is situated in the operating position, i.e., in particular, in which an energy release of the energy store, for example, to the auxiliary motor, is enabled. A "fixing" in this context is understood to mean, in particular, a positionally fixed and/or non-rotatable connection. The pressure force, which the tensioning unit exerts on the energy store in the tensioned operating state, is at least one-thirtieth, preferably at least one-tenth, advantageously at least one-fifth, preferably at least one and particularly preferably at least twofold of a weight force of the energy store. The longitudinal direction of the carrier element extends, in particular, in parallel to a main extension direction of the carrier element. A "main extension direction" of an object in this case is understood to mean, in particular, a direction that extends in parallel to the longest edge of a smallest geometrical cube, which just completely encloses the object. The pressure force acts, in particular, at least essentially in parallel to an intended insertion direction of the energy store into the holding device. "Intended" is understood to mean, in particular, specifically designed and/or equipped. An object being provided for a particular function is understood to mean, in particular, that the object fulfills and/or carries out this particular function in at least one application state and/or operating state.

In accordance with an example embodiment of the present invention, it is further provided that the tensioning unit includes an operating element which, apart from a key, is designed, in particular, to be operable without tools for operating a lock. This may advantageously allow for a particularly simple mounting, a particularly simple dismounting or a particularly simple replacement of the energy store. The tensioning unit is operable, in particular, purely by hand using the operating element. In this way, a particularly high degree of user-friendliness may be advantageously achieved. An "operating element" is understood to mean, in particular, an element that includes an operating surface for adjusting the operating state (the tensioned operating state and the relaxed operating state) of the tensioning unit by an operator. The operating element is designed, in particular, as a lever, for example, a tilt lever, as a pull lever or as a rotary lever or as a button, for example, as a key or a push button. In an embodiment of the operating element as a tilt lever, in particular, a simple ergonomics may be advantageously achieved, in particular, since in this case, an actuation direction of the tilt lever overlaps with an insertion direction of the energy store into the holding device predefined by the carrier element. It is possible, in particular, that the tensioning unit includes a toggle lever, the operating element preferably forming at least a part, in particular, an arm of the toggle lever. The use of a toggle lever may advantageously result in a high tensioning force in the tensioning process during a manual operation with the operator exerting essentially the same amount of force. An actuation force for actuating the operating element is, in particular, at least essentially constant or linear, whereas the pressure force generated by a tensioning element of the toggle lever, which forms, in particular, a further arm of the toggle lever, increases or drops exponentially. As a result of a toggle lever, the operating element may also be advantageously mounted at least essentially force-free in the tensioned state since, in particular, the pressure force engages at another arm of the toggle lever. In this way a long service life of the tensioning unit may be advantageously achieved. Alternatively or in addition to a toggle lever, the tensioning unit may include a turning lock, a screw cap, a bayonet catch or the like as a tensioning mechanism. The operating element also forms, in particular, a grip element, which is provided for at least facilitating a removal of the energy store. The grip element is designed, in particular, as a draw shackle. The draw shackle may be advantageously graspable by an operator's hand and usable for extracting the energy store from the holding device.

In accordance with an example embodiment of the present invention, it is also provided that the tensioning unit includes a tensioning element, which is provided to support at least a major portion of the pressure force occurring thereby on the carrier element or on the frame unit in the tensioned operating state. This may advantageously result in a secure holding of the energy store. In addition, a tensioning force, in particular, the pressure force, may advantageously be built up preferably close to the carrier element of the carrier unit. Higher forces may be absorbed by the tensioning unit, in particular, in the case of a shorter distance of a working point of the tensioning force perpendicular to an average force direction on the energy store from a working point of the tensioning force on the carrier element. The tensioning element forms, in particular, at least a part, in particular, an arm of the toggle lever, which is preferably different from the operating element. The tensioning element is connected, in particular, via a hinge to the operating element. Alternatively, it is also possible, however, that the tensioning unit includes merely a simple tilt lever with no toggle lever geometry. In this case, the operating element may, in particular, also be formed as one piece with the tensioning element. The tensioning element is provided, in particular, to hook a part of the carrier unit or a part of the frame unit during the tensioning process for generating the pressure force.

In accordance with an example embodiment of the present invention, if the tensioning element includes a form-fit element a particularly secure force transfer between the tensioning element and the carrier element or the frame unit may be advantageously achieved. A particularly secure and particularly stable holding of the energy store in the holding device may be advantageously achieved. The form-fit element is provided, in particular, to produce a form-lock at least with one part of the carrier unit or at least with one part of the frame unit. The form-fit element forms, in particular, a form-fit mating element, which is provided to engage in a corresponding form-fit recess for producing a form-fit connection. The form-fit element has, in particular, a hook-like design. The form-fit element is provided, in particular, to hook with a part of the carrier unit, in particular, with a corresponding form-fit element of the carrier unit, or with a part of the frame unit, in particular with a corresponding form-fit element of the frame unit during the tensioning process for generating the pressure force. The hooking may take place, in particular, with a part of the carrier unit or with the frame unit, which is situated arbitrarily, for example, on the right side, on the left side on an upper surface or on a lower surface relative to the positioning direction of the frame unit, in particular, of the bicycle frame.

In accordance with an example embodiment of the present invention, if the carrier unit or the frame unit also includes at least the corresponding form-fit element, which is provided to interlock with at least one tensioning element of the tensioning unit, in particular, with the form-fit element of the tensioning element, for producing the tensioned operating state, a particularly secure force transfer between the tensioning element and the carrier element or the frame unit may be advantageously achieved. A particularly secure and particularly stable holding of the energy store in the holding device may be advantageously achieved. The corresponding form-fit element is provided, in particular, to produce a form-lock at least with one part of the tensioning unit during the tensioning process. The corresponding form-fit element forms, in particular, a form-fit recess, which is provided to receive at least one part of a form-fit mating element for producing a form-fit connection. The corresponding form-fit element is designed, in particular, as a recess or as a cavity in the carrier unit or in the frame unit. The corresponding form-fit element is designed preferably as a hole, in particular, as an elongated hole, in the carrier element. The corresponding form-fit element may be situated, in particular, relative to the positioning direction of the frame unit, in particular, of the bicycle frame, viewed at an arbitrary side, for example, at a right side, at a left side, at an upper side or at a lower side of the carrier element or of the frame unit.

The carrier element preferably includes two or more corresponding form-fit elements, which are situated at various distances from the stop unit along a longitudinal direction of the carrier element, as a result of which a holding of energy stores with various longitudinal extensions may be made possible. Alternatively or in addition, it is possible that the holding device includes an adapter element, which is provided to be clamped between the stop element and the energy store. The adapter element in this case is preferably through-contacted in order to ensure an electrical connection between the energy store and the stop element.

In accordance with an example embodiment of the present invention, it is also provided that the tensioning unit includes a locking mechanism, which secures at least one operating element of the tensioning unit and/or at least one tensioning element of the tensioning unit in the tensioned operating state. In this way, a particularly secure and particularly simple holding of the energy store to be operated may be achieved by the holding device. This may advantageously prevent the energy store from automatically releasing or falling out. A two-step holding of the energy store may be advantageously achieved, it being possible for an immediate release or falling out of the energy store and damage associated therewith to be avoided, in particular, even in the case of a failure of one of the steps. The locking mechanism is provided, in particular, to secure and/or to hold the tensioning element and/or the operating element in a tensioned position. The locking mechanism is provided, in particular, to maintain at least essentially the pressure force generated by the tensioning unit during the securing of the tensioned operating state. The locking mechanism includes, in particular, at least one latching element, for example, a latching hook, which is provided, in particular, to latch at least the operating element in an end position of the tensioned operating state. The latching element is, in particular, situated separately from the operating element and/or from the tensioning element. The locking mechanism includes, in particular, at least one locking element, which is provided to secure the latching of the operating element in the end position of the tensioned operating state. The locking element is situated, in particular, in and/or on the operating element and/or on the tensioning element. The locking mechanism, in particular, the locking element, includes a further operating element. The further operating element may be designed, in particular, as a push button, as a lever, for example, a turning lever or a tilt lever or as an electrically operable operating element, for example, as an electrical actuator, preferably as a servo drive. The further operating element is preferably situated laterally on the tensioning unit as viewed from a front side of the tensioning unit, in particular, from a side of the tensioning unit at which the operating element is situated. Alternatively, the further operating element may, however, be situated on an arbitrary surface of the tensioning unit.

In accordance with an example embodiment of the present invention, it is also provided that the stop unit includes at least one spring mechanism, which generates at least in the tensioned operating state a spring force, which counteracts a tensioning force of the tensioning unit. This may enable a particularly advantageous clamping of the battery store. A tolerance compensation for a longitudinal extension of the energy store may be advantageously enabled as a result. The spring mechanism may include, in particular, a coil spring, a leg spring, a volute spring, a leaf spring and/or a disk spring. Alternatively, it is also possible that the spring mechanism includes a gas pressure spring or an elastic material, such as foam or rubber. The tensioning unit in combination with the spring mechanism is provided, in particular, when mounting the energy store and/or when removing the energy store, to move the energy store at least in sections along the carrier element that forms a guide rail for guiding the energy store. The spring mechanism is also provided, in particular, to push the energy store at least part way out of the operating position when the tensioned operating state is released, in particular, when a tension generated by the tensioning unit is released. In this way, the operating element, in particular, is released from its latched position and is advantageously easily graspable. The remaining tensioning force of the tensioning unit no longer secured by the locking mechanism is, in particular, high enough to prevent the energy store from falling out when opening the locking mechanism, in particular, even if the longitudinal direction of the energy store were to be oriented in parallel to a direction of gravitational force.

In accordance with an example embodiment of the present invention, it is further provided that the holding device includes the lock, which is provided to block and/or to unblock the tensioning unit, in particular, the operating element and/or the locking mechanism, preferably the further operating element and/or the locking element. This may advantageously prevent an unauthorized access to the energy store. The lock forms, in particular, an anti-theft device. In particular, the lock blocks the operating element, the further operating element or the locking element. The lock is designed, in particular, separately from the locking mechanism and/or from the operating element. Alternatively, it is also possible, however, that the lock may fulfill at least one subtask of the locking mechanism and/or be designed as one piece with the locking mechanism and/or with the operating element. For example, the lock may be designed as one piece with the latching element or preferably with the locking element. In this case, an opening of the lock would also trigger a release of the fixing of the operating element from its latching position. The lock is situated preferably at the front side of the tensioning unit, in particular, at the side of the tensioning unit at which the operating element is situated. Alternatively, the further operating element may, however, be situated at an arbitrary surface, for example, also at a side face of the tensioning unit or of the frame unit.

In accordance with an example embodiment of the present invention, it is further provided that the stop unit includes a plug element on a side facing the tensioning unit at least in the tensioned operating state. In this way, a particularly simple coupling and/or decoupling of the energy store using an energy consumer, in particular, using the auxiliary motor, may be advantageously achieved. The energy store includes, in particular, a plug element corresponding to the plug element. The tensioning unit is provided, in particular, to shift the energy store during the tensioning process far enough in the direction of the stop unit that the plug elements of the stop element and of the energy store become electroconductively connected. The spring mechanism of the stop element is provided, in particular, to push the energy store when being released by the tensioning force generated by the tensioning element far enough out of the operating position that the plug elements of the stop element and of the energy store are electrically separated.

In addition, it is provided that the holding device includes the energy store, at least one part of the tensioning unit being fixedly connected to the energy store. A particularly simple design of the holding device may be advantageously achieved as a result. At least the latching element, the operating element, the tensioning element and/or a housing of the tensioning element is/are connected to the energy store.

If, alternatively or in addition, at least one part of the tensioning unit is fixedly connected to the carrier element, costs may be advantageously held to a minimum, in particular, since not all parts of the tensioning unit need to be assigned to every energy store. It is also possible that at least a major part of the tensioning unit or the entire tensioning unit is designed separately from the energy store and/or is fixedly connected to the carrier element. The carrier element includes for this purpose, in particular, a hole pattern, which enables the tensioning unit to be fixed to, in particular, screwed together with, the carrier element. The tensioning unit fixed at the carrier element is, in particular, partially or completely tiltable or pivotable. This may further enable a simple insertion of the energy store into the carrier unit, in particular, into the frame unit. The tensioning unit fixed at the carrier element includes, in particular, a tensioning element, which engages in a recess of the energy store instead of in a recess of the carrier element for producing the tensioned state, is hooked with the energy store or pressingly engages on a surface of the energy store.

In accordance with an example embodiment of the present invention, a bicycle frame including the holding device is also provided, the bicycle frame including a frame element of tubular design, in particular, the lower tube, which is provided to receive at least a major part of the holding device and/or at least a major part of an energy store held with the aid of the holding device in its interior. A particularly space-saving stowage of the energy store may be advantageously achieved in this way. In addition, a stowage possibility may be advantageously created for an energy store that is particularly long and thus has a high energy store capacity. The energy store is preferably inserted along its longitudinal direction into the frame element. The carrier element extends, in particular, in parallel to the frame element. During mounting, the energy store is pushed in, guided along the carrier element until the energy store meets the stop element fixed on the carrier element. Alternatively, it is also possible, however, that the energy store is introduced through a lateral opening of the frame element into the interior of the frame element.

The holding device according to the present invention and the bicycle frame according to the present invention are not restricted here to the above-described application and specific embodiment. The holding device according to the present invention and the bicycle frame according to the present invention may, in particular, include a number differing from a number of individual elements, components and units cited herein for carrying out an operating mode described herein. In addition, in the case of the value ranges specified in this description, values falling within the cited limits are also to be considered disclosed and arbitrarily usable.

BRIEF DESCRIPTION OF THE DRAWINGS

Further advantages result from the following description. One exemplary embodiment of the present invention is represented in the figures. The figures and the description contain numerous features in combination. Those skilled in the art will also advantageously consider the features separately and combine them to form meaningful further combinations, in view of the disclosure herein.

FIG. 8 schematically shows a side view of the holding device including an alternative energy store, in accordance with an example embodiment of the present invention.

DETAILED DESCRIPTION OF EXAMPLE EMBODIMENTS

Figure 1:
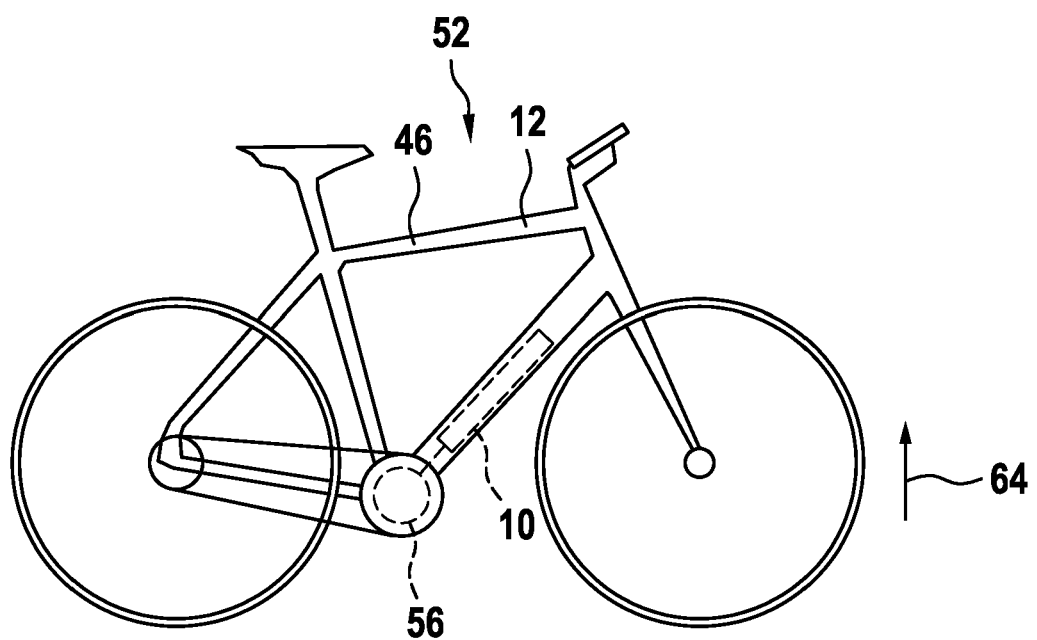
FIG. 1 schematically shows a representation of a bicycle including a bicycle frame according to an example embodiment of the present invention.
Figure 2A:
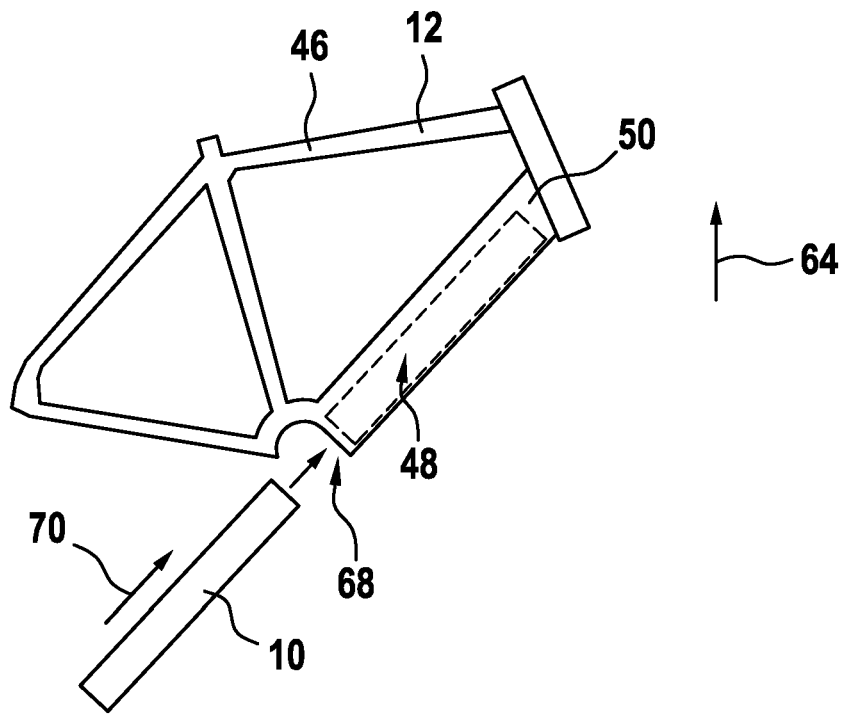
FIG. 2A schematically shows a representation of a first variant of the bicycle frame including a holding device according to an example embodiment of the present invention and including an energy store.
Figure 2B:
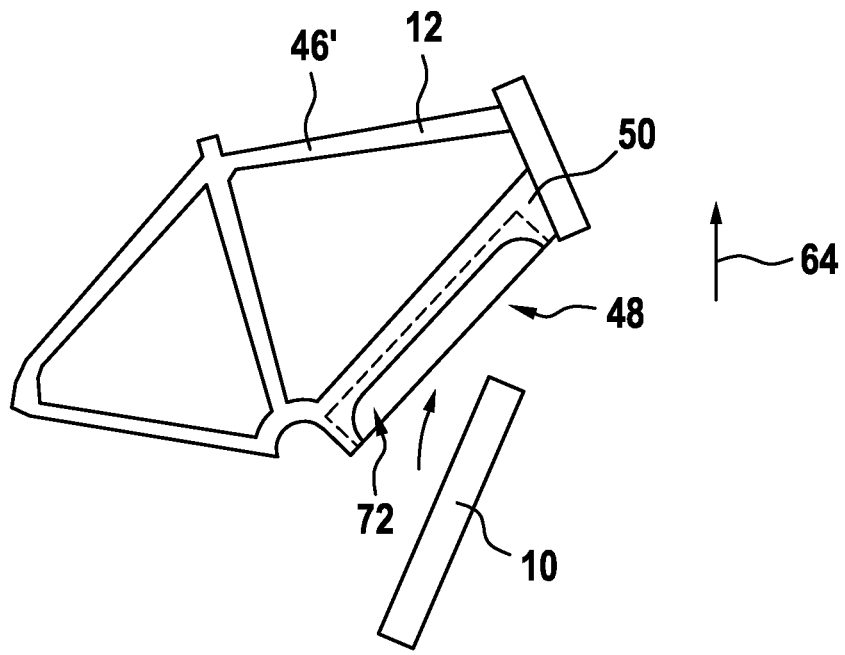
FIG. 2B schematically shows a representation of a second variant of the bicycle frame including the holding device and the energy store, according to an example embodiment of the present invention.

FIG. 1 shows a bicycle 52 including an auxiliary motor 56 and including an energy store 10. Bicycle 52 is designed as a Pedelec or as an E-bike. Energy store 10 is provided to supply auxiliary motor 56 with electrical power. Energy store 10 is designed as an accumulator. Bicycle 52 includes a frame unit 12 designed as bicycle frame 46. FIGS. 2A and 2B show two variants of bicycle frame 46, 46'. Bicycle frame 46 includes a frame element 50. Frame element 50 has a tubular design. Frame element of tubular design 50 has a round cross section, but could alternatively also have an oval, an angular or a differently shaped cross section. Frame element 50 is designed as a lower tube of bicycle frame 46, 46'. Bicycle frame 46, 46' includes a holding device 48. Frame element 50 is provided to receive at least a major part of holding device 48 in its interior. Frame element 50 is provided to receive at least a major part of an energy store held with the aid of holding device 48 in its interior. In the exemplary embodiment of FIG. 2A, bicycle frame 46 includes an opening 68 at an underside of frame element 50. Energy store 10 is inserted through opening 68 along a longitudinal direction 70 of energy store 10 into the interior of frame element 50. In the alternative exemplary embodiment of FIG. 2B, bicycle frame 46' includes a lateral opening 72 on frame element 50. Energy store 10 is inserted, in particular, pivoted through lateral opening 72 into the interior of frame element 50. Lateral opening 72 points essentially downward as viewed in a positioning direction 64 of bicycle 52.

Figure 3:
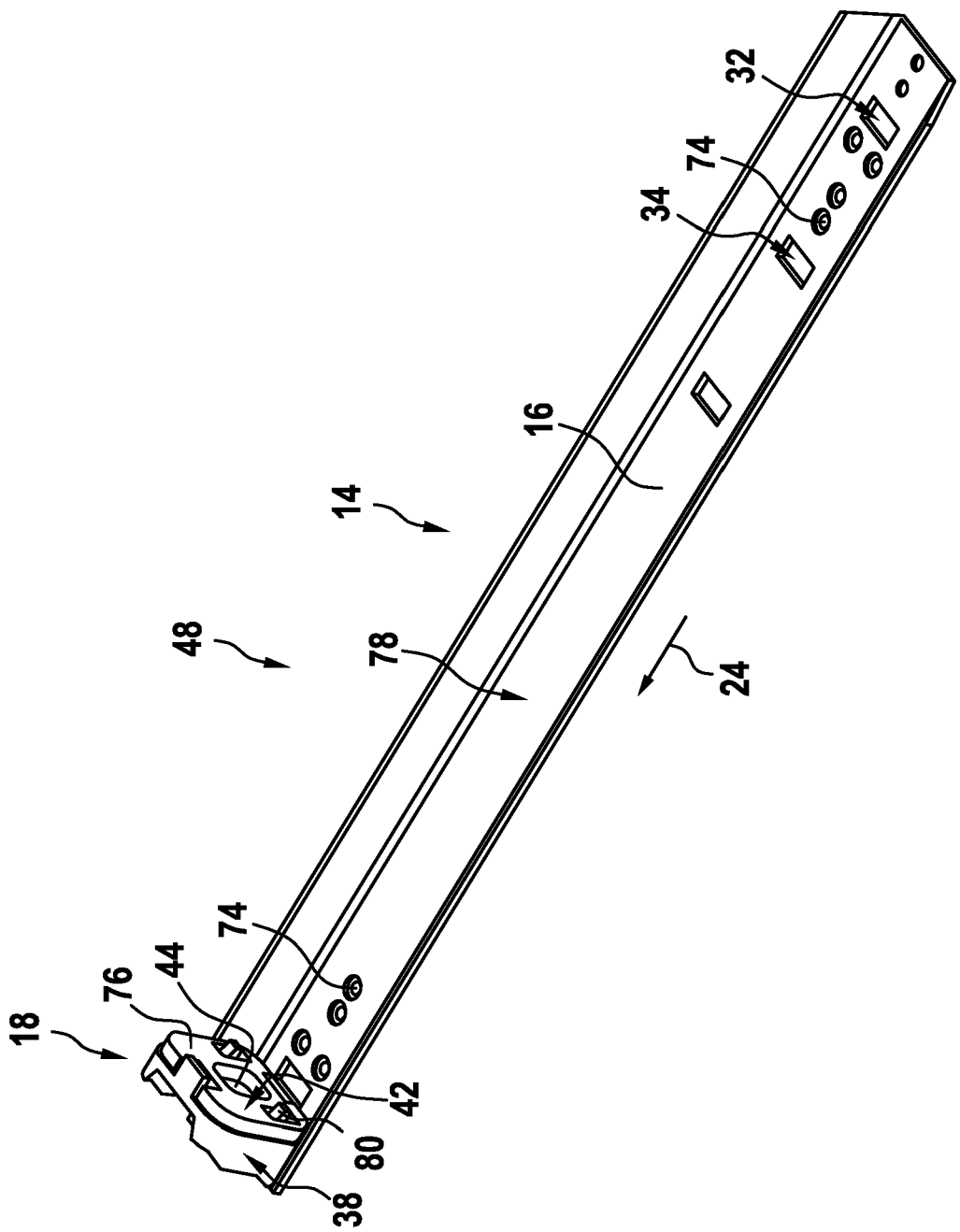
FIG. 3 schematically shows a representation of one part of the holding device, in accordance with an example embodiment of the present invention.

FIG. 3 shows a part of holding device 48. Holding device 48 is provided for releasably holding energy store 10 at bicycle frame 46. Holding device 48 includes a carrier unit 14. Carrier unit 14 includes a carrier element 16. Carrier element 16 is designed as a curved bent sheet metal part. Carrier element 16 forms a guide rail for guiding energy store 10. Carrier element 16 has a longitudinal direction 24. Energy store 10 is guided along longitudinal direction 24 by a carrier element designed as a guide rail. Carrier element 16 includes a receiving area 78 for energy store 10. Energy store 10 is situated, in particular, clamped, at least in a tensioned operating state 22 of holding device 48 (cf. FIG. 4A) in receiving area 78 of carrier element 16. Carrier element 16 includes fastening elements 74. Fastening elements 74 are designed as boreholes. Carrier element 16 is fixable onto bicycle frame 46 with the aid of fastening elements 74.

Holding device 48 includes a stop unit 18. Stop unit 18 is fixedly connected to carrier unit 14, in particular, to carrier element 16. Stop unit 18 is fixedly attached at carrier element 16. Stop unit 18 includes a spring mechanism 38. Stop unit 18 includes a stop part 76. Spring mechanism 38 is provided to pre-stress stop part 76. Spring mechanism 38 is provided to contribute to a tensioning force holding energy store 10. Spring mechanism 38 presses stop part 76 in a direction parallel to longitudinal direction 24 and pointing toward receiving area 78 of carrier element 16. Stop unit 18 includes a plug element 44. Plug element 44 is used for electrically contacting an energy store 10 inserted into receiving area 78. Plug element 44 is situated on a side 42 of stop unit 18 facing receiving area 78. In tensioned operating state 22, plug element 44 is situated on a side 42 facing a tensioning unit 20 of holding device 48. Stop unit 18 includes mating elements 80. Mating elements 80 are provided to engage in corresponding recesses (not shown) of energy store 10. This may advantageously improve a holding of energy store 10 and/or prevent a non-fitting energy store 10 from being pressed into receiving area 78 and thereby potentially damaging plug element 44.

Figure 4A:
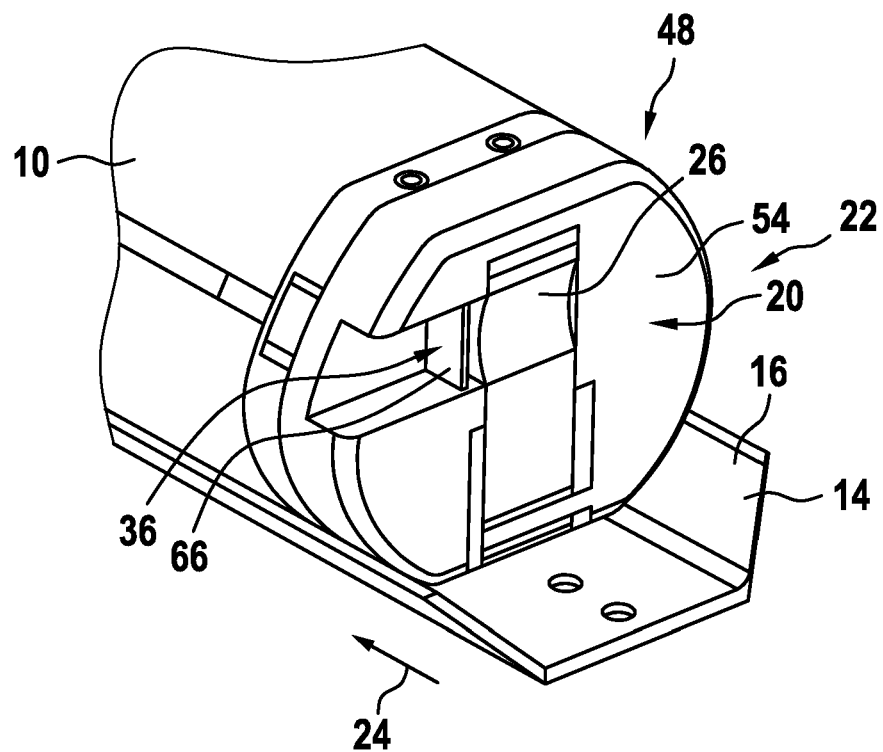
FIG. 4A schematically shows a representation of one further part of the holding device, including a tensioning unit in a tensioned operating state, in accordance with an example embodiment of the present invention.

FIG. 4A shows a further part of holding device 48 in tensioned operating state 22. Holding device 48 includes tensioning unit 20. Tensioning unit 20 is provided to fix energy store 10 at carrier unit 14 in tensioned operating state 22. Tensioning unit 20 is provided to clamp energy store 10 between tensioning unit 20 and stop unit 18 in an operating position in such a way that tensioning unit 20 exerts a pressure force on energy store 10 in tensioned operating state 22, which acts in the direction of stop unit 18. The pressure force exerted on energy store 10 by tensioning unit 20 in tensioned operating state 22 acts in parallel to longitudinal direction 24 of carrier element 16. Spring mechanism 38 shown in FIG. 3 generates a spring force in tensioned operating state 22, which counteracts the tensioning force of tensioning unit 20. Tensioning unit 20 is fixedly connected to energy store 10. Tensioning unit 20 is mounted at energy store 10. Tensioning unit 20 includes a housing 54. Housing 54 closes tensioning unit 20 off outwardly at least on one side facing away from energy store 10. Tensioning unit 20 includes an operating element 26. Operating element 26 is designed as a tilt lever. Operating element 26 is designed to be operable without tools. Tensioning unit 20 includes a locking mechanism 36. Locking mechanism 36 secures operating element 26 in tensioned operating state 22. Locking mechanism 36 includes a further operating element 66. Further operating element 66 is designed as a push button. Further operating element 66 is provided at least to release the safeguard of locking mechanism 36 during an actuation. Operating element 26 in a closed state, i.e., in tensioned operating state 22, is flush with a front side of tensioning unit 20, in particular, with housing 54 of tensioning unit 20. This may advantageously preclude an undesirable manipulation (i.e., a theft). In addition, an operator of operating element 26 may be advantageously provided a clear indication that operating element 26, and thus energy store 10, is correctly fixed.

Figure 4B:
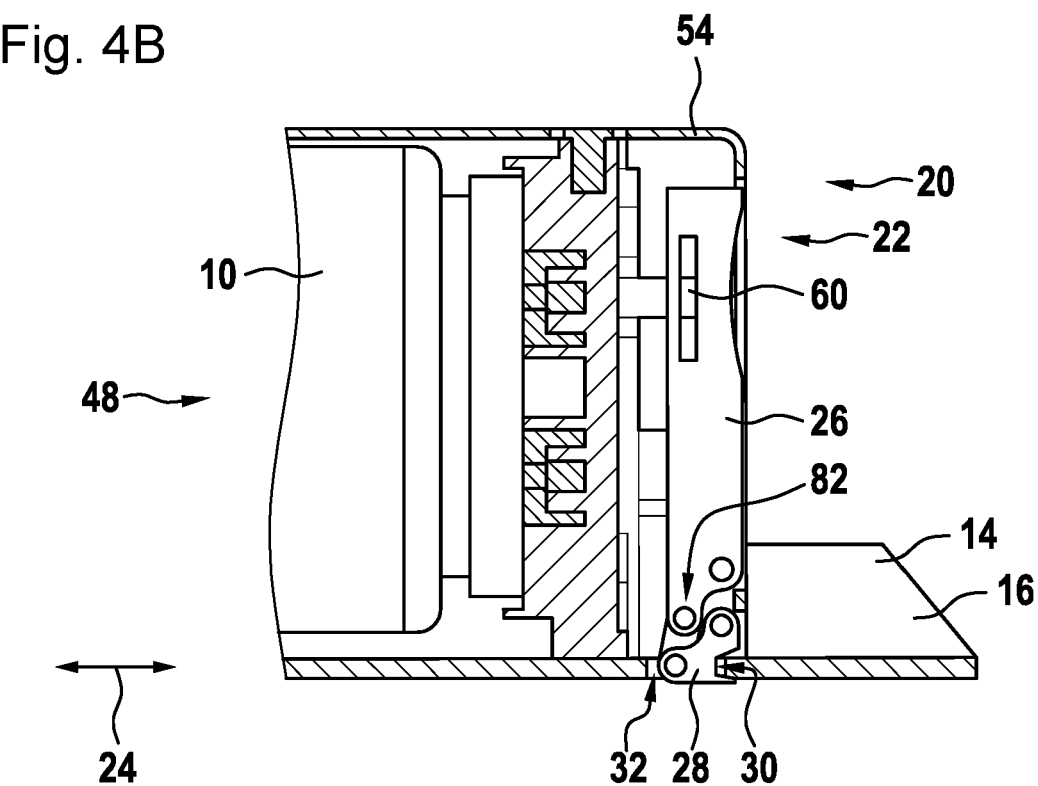
FIG. 4B schematically shows a representation of a perpendicular section of the further part of the holding device from FIG. 4A, in accordance with an example embodiment of the present invention.

FIG. 4B shows a perpendicular section through the further part of holding device 48 from FIG. 4A. Tensioning unit 20 includes a tensioning element 28. Tensioning unit 20 includes a toggle lever 82. Operating element 26 forms an arm of toggle lever 82. Tensioning element 28 forms a further arm of toggle lever 82. A pivoting of operating element 26 causes a pivoting of tensioning element 28. Tensioning element 28 in tensioned operating state 22 is provided to support at least a major portion of the occurring pressure force at carrier element 16. Alternatively, tensioning element 28 in tensioned operating state 22 may be provided to support the pressure force directly at frame unit 12. Tensioning element 28 includes a form-fit element 30. Form-fit element 30 has a hook-like design. Tensioning unit 20 is provided to maintain the pressure force in tensioned operating state 22. Carrier element 16 includes corresponding form-fit elements 32, 34. Corresponding form-fit elements 32, 34 are provided to interlock with tensioning element 28 of tensioning unit 30 to produce tensioned operating state 22. Corresponding form-fit elements 32, 34 are designed as recesses in carrier element 16. Hook-like form-fit element 30 in tensioned operating state 22 engages in a corresponding form-fit element 32, 34, and in the process hooks corresponding form-fit element 32, 34. Tensioning unit 20 is pressed in the direction of energy store 10 by the toggle lever geometry of toggle lever 82 when operating element 26 is closed. It is also apparent from FIG. 3 that carrier element 16 includes multiple corresponding form-fit elements 32, 34. The different corresponding form-fit elements 32, 24 are situated at different distances from stop unit 18 along longitudinal direction 24 of carrier element 16. The different corresponding form-fit elements 32, 34 are used to enable a mounting of energy stores 10 of different lengths.

Figure 5A:
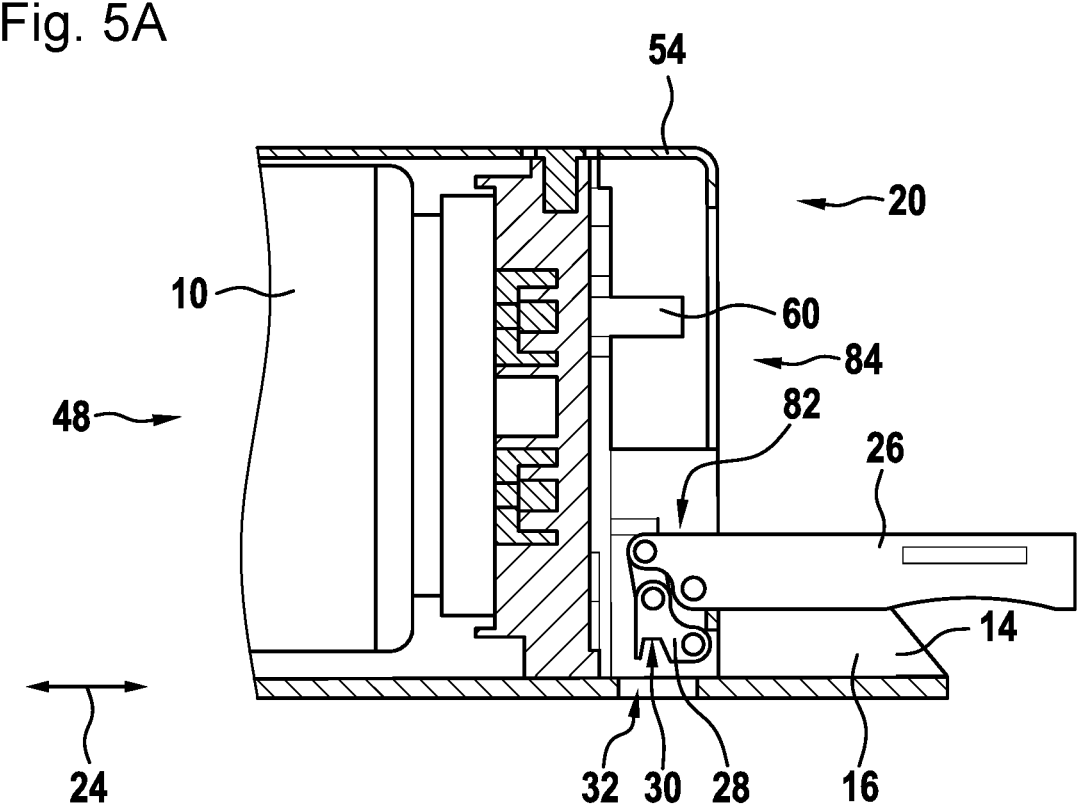
FIG. 5A schematically shows a representation of the further part of the holding device including the tensioning unit in a relaxed operating state, in accordance with an example embodiment of the present invention.
Figure 5B:
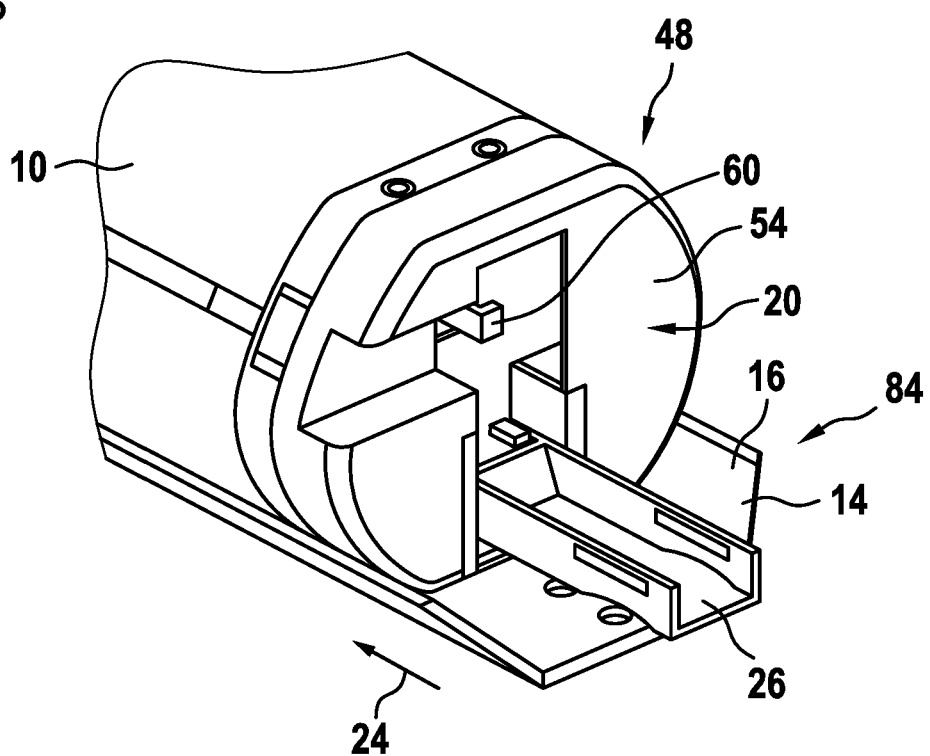
FIG. 5B schematically shows a representation of a perpendicular section of the further part of the holding device from FIG. 5A, in accordance with an example embodiment of the present invention.

FIGS. 5A and 5B show the part of holding device 48 in a relaxed operating state 84. Operating element 26 is folded completely outwardly. As a result of the toggle lever geometry, tensioning unit 28 is folded out of corresponding form-fit element 32, 34 of carrier unit 14. Operating element 26 and tensioning element 28 are free of contact from carrier unit 14. Energy store 10 including tensioning unit 20 is removable in relaxed operating state 84 from receiving area 78 along longitudinal direction 24 of carrier element 16. Operating element 26 in relaxed operating state 84 forms a grip element, in particular, a draw shackle. For the sake of clarity, parts of locking mechanism 36 are omitted in FIGS. 4A and 4B.

Figure 6:
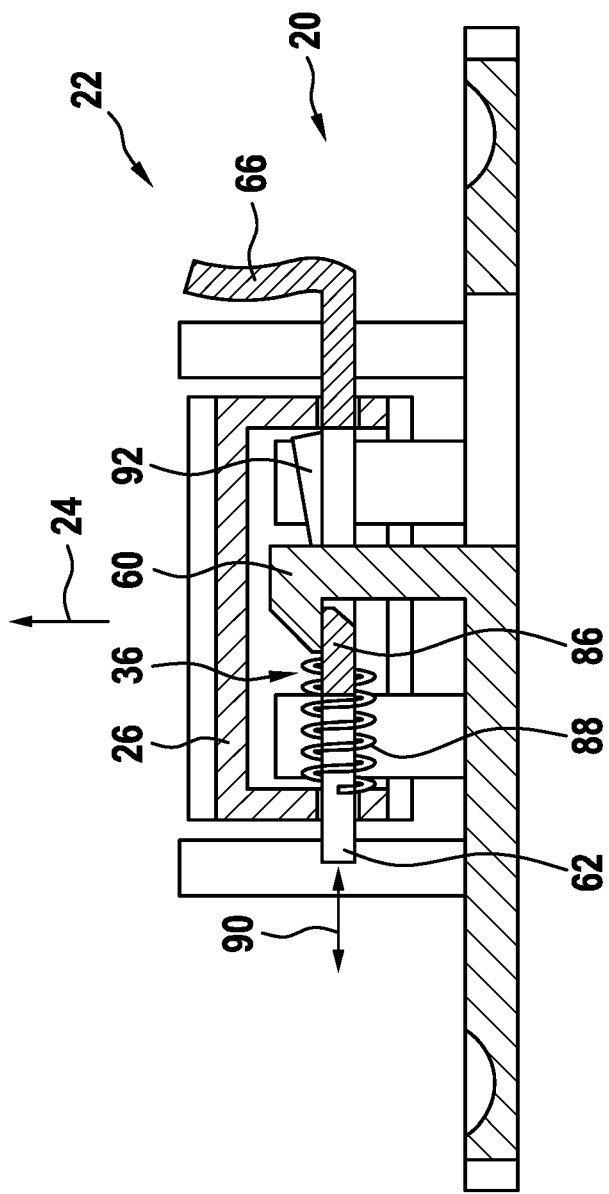
FIG. 6 schematically shows a representation of a horizontal section through a part of the tensioning unit including a locking mechanism, FIG. 7 schematically shows an exploded representation of one part of the tensioning unit, in accordance with an example embodiment of the present invention.

FIG. 6 shows a horizontal section through a part of tensioning unit 20 including locking mechanism 36. In the position shown in FIG. 6, operating element 26 is secured by locking mechanism 36 in tensioned operating state 22. Locking mechanism 36 includes a latching element 60. Latching element 60 is designed as an engagement hook. Locking mechanism 36 includes a locking element 62. Locking element 62 is inserted into operating element 26. Locking element 62 includes further operating element 66. Locking element 62 includes a counterpart 86. Counterpart 86 abuts the engagement hook in tensioned operating state 22 secured by locking mechanism 36. Locking element 62 is latched to the engagement hook via counterpart 86. The latching of counterpart 86 of locking element 62 with the engagement hook prevents a movement of operating element 26 connected to locking element 62 at least in one pivot direction of operating element 26, in particular, in a direction parallel to longitudinal direction 24 of carrier element 16. Locking mechanism 36 includes a spring element 88. Spring element 88 stores locking element 62 relative to operating element 26. Locking element 62 is supported at operating element 26 via spring element 88 in the direction of an actuation direction 90 of locking element 62, in particular, of further operating element 26. By pressing on further operating element 66, spring element 88 is compressed and counterpart 86 is removed from engagement with latching element 60. As a result, energy store 10 is pushed part way out of receiving area 78 by spring mechanism 38 of stop unit 18. In this way, operating element 26 is easily pivoted so that a re-engaging of locking element 62 with latching element 60 is no longer possible. Energy store 10 is released as a result and may be removed from receiving area 78 along longitudinal direction 24. Locking element 62 includes a positioning element 92. Positioning element 92 is provided to prevent locking element 62 from releasing from operating element 26. In addition, positioning element 92 is provided to limit a maximum expansion of spring element 88.

Figure 7:
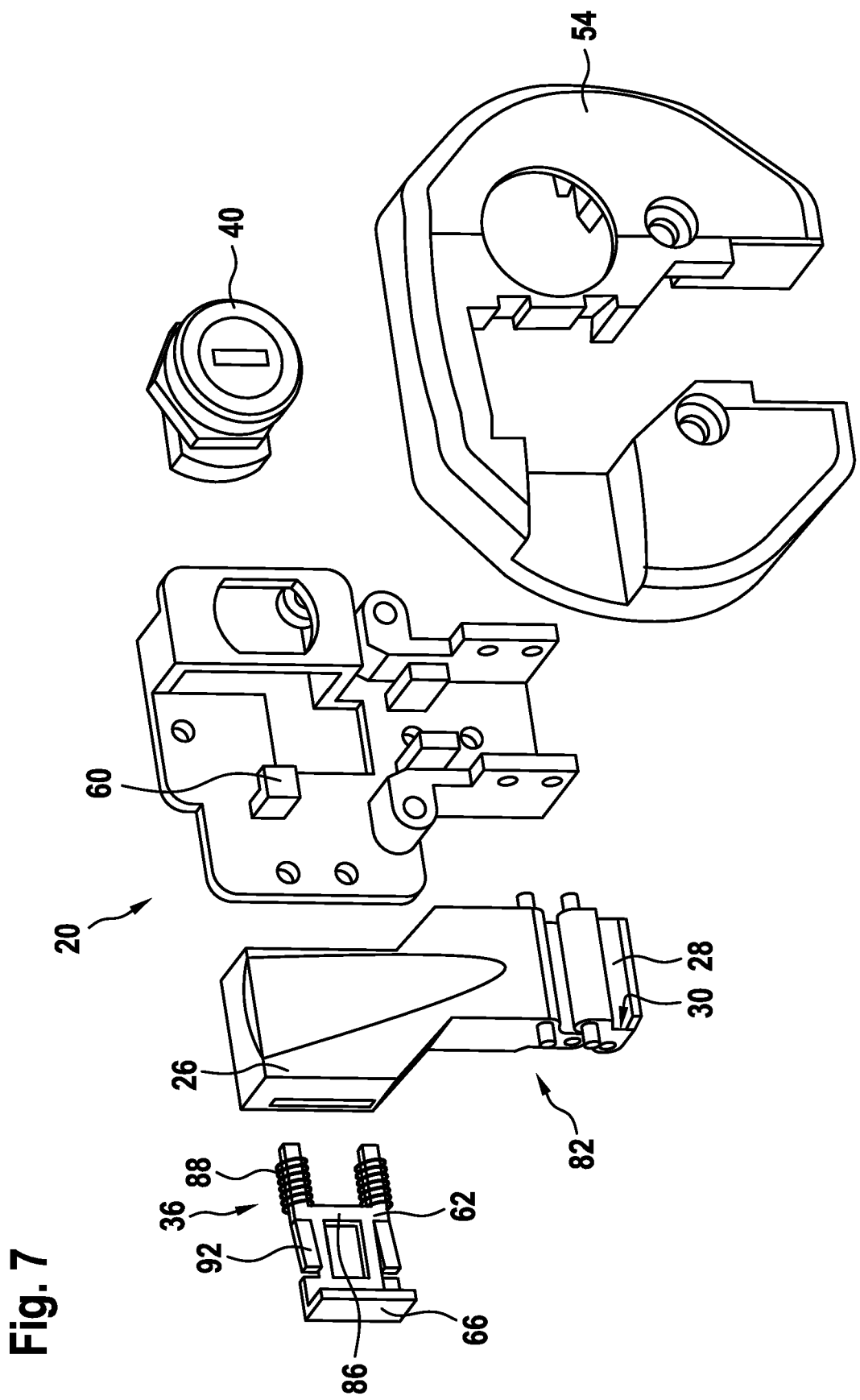

FIG. 7 shows an exploded representation of a part of tensioning unit 20. Individual parts of tensioning unit 20 shown in FIG. 7 have shapes differing slightly from the previous figures; however, the functions are essentially identical. Components that have the same designations or reference numerals in the following description and figures correspond to the aforementioned components and have their functions. In addition to the embodiment of FIG. 1 through FIG. 6, holding device 48 from FIG. 7 includes a lock 40. Lock 40 is provided to block and/or to unblock tensioning unit 20. Lock 40 is integrated into housing 54 of tensioning unit 20.

FIG. 8 shows a side view of holding device 48 including an alternative energy store 10'. Alternative energy store 10' is shorter than the above-shown energy store 10. Alternative energy store 10' is shorter than receiving area 78, as viewed along longitudinal direction 24. FIG. 8 also shows an alternative tensioning unit 20'. Alternative tensioning unit 20' is fixedly connected to carrier element 16. Alternative tensioning unit 20' is designed separately from alternative energy store 10'. Holding device 48 includes an adapter element 58. Adapter element 58 is provided to fill a gap 102 formed between stop element 18 and alternative energy store 10'. Adapter element 58 has a longitudinal extension that corresponds to a longitudinal extension of gap 102. Adapter element 58 includes at least one plug element 94, 96 each on two opposing sides. First plug element 94 of adapter element 58 is provided for a connection to plug element 44 of stop unit 18. Second plug element 96 of adapter element 58 is provided for a connection to a plug element 98 of alternative energy store 10'. Plug elements 94, 96 of adapter element 58 are connected to one another by an electrical line 100. Adapter element 58 is through-contacted.

What is claimed is:

1. A holding device for releasably holding an energy store at a frame unit, comprising:
at least one carrier unit;
a stop unit connected to a carrier element of the carrier unit; and
a tensioning unit configured to fix the energy store at the carrier unit in a tensioned operating state and to clamp the energy store between the tensioning unit and the stop unit in an operating position in such a way that the tensioning unit exerts a pressure force on the energy store in the tensioned operating state, which acts in a direction of the stop unit parallel to a longitudinal direction of the carrier element,
wherein the carrier unit or the frame unit includes at least one corresponding form-fit element, which is provided to interlock with at least one tensioning element of the tensioning unit for producing the tensioned operating state.

2. The holding device as recited in claim 1, wherein the frame unit is a bicycle frame.

3. The holding device as recited in claim 1, wherein the tensioning unit includes an operating element which is operable without tools.

4. The holding device as recited in claim 1, wherein the tensioning unit includes a tensioning element, which is configured to support a major portion of a pressure force occurring on the carrier element or on the frame unit.

5. The holding device as recited in claim 4, wherein the tensioning element includes a form-fit element.

6. The holding device as recited in claim 1, wherein the carrier element includes two or more corresponding form-fit elements, which are situated at various distances from the stop unit along the longitudinal direction of the carrier element.

7. The holding device as recited in claim 1, wherein the tensioning unit includes a locking mechanism configured to secure at least one operating element of the tensioning unit and/or at least one tensioning element of the tensioning unit in the tensioned operating state.

8. The holding device as recited in claim 1, wherein the stop unit includes at least one spring mechanism, configured to generate a spring force at least in the tensioned operating state, which counteracts a tensioning force of the tensioning unit.

9. The holding device as recited in claim 1, wherein at least one part of the tensioning unit is fixedly connected to the energy store.

10. The holding device as recited in claim 1, wherein at least one part of the tensioning unit is fixedly connected to the carrier element.

11. A holding device for releasably holding an energy store at a frame unit, comprising:
at least one carrier unit;
a stop unit connected to a carrier element of the carrier unit; and
a tensioning unit configured to fix the energy store at the carrier unit in a tensioned operating state and to clamp the energy store between the tensioning unit and the stop unit in an operating position in such a way that the tensioning unit exerts a pressure force on the energy store in the tensioned operating state, which acts in a direction of the stop unit parallel to a longitudinal direction of the carrier element,
a lock to block or to unblock the tensioning unit, wherein the lock is located on the energy store.

12. A holding device for releasably holding an energy store at a frame unit, comprising:
at least one carrier unit;
a stop unit connected to a carrier element of the carrier unit; and
a tensioning unit configured to fix the energy store at the carrier unit in a tensioned operating state and to clamp the energy store between the tensioning unit and the stop unit in an operating position in such a way that the tensioning unit exerts a pressure force on the energy store in the tensioned operating state, which acts in a direction of the stop unit parallel to a longitudinal direction of the carrier element, wherein the stop unit includes a plug element on a side facing the tensioning unit at least in the tensioned operating state.

13. A bicycle frame, comprising:

a holding device for releasably holding an energy store at the frame, including:

at least one carrier unit;

a stop unit connected to a carrier element of the carrier unit; and a tensioning unit configured to fix the energy store at the carrier unit in a tensioned operating state and to clamp the energy store between the tensioning unit and the stop unit in an operating position in such a way that the tensioning unit exerts a pressure force on the energy store in the tensioned operating state, which acts in a direction of the stop unit parallel to a longitudinal direction of the carrier element, wherein the carrier unit or the frame unit includes at least one corresponding form-fit element, which is provided to interlock with at least one tensioning element of the tensioning unit for producing the tensioned operating state.

14. The bicycle frame as recited in claim 13, wherein a frame element of tubular configuration is provided to receive in its interior at least a major part of the holding device and/or at least a major part of an energy store held using the holding device.

* * * * *